United States Patent
Nonaka et al.

(10) Patent No.: US 8,859,900 B2
(45) Date of Patent: Oct. 14, 2014

(54) FLAME-RETARDANT COMPOSITION, COVERED ELECTRIC WIRE, AND WIRING HARNESS

(75) Inventors: Tsuyoshi Nonaka, Yokkaichi (JP); Keiji Itagaki, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 208 days.

(21) Appl. No.: 12/994,212

(22) PCT Filed: Jun. 17, 2009

(86) PCT No.: PCT/JP2009/060987
§ 371 (c)(1),
(2), (4) Date: Nov. 23, 2010

(87) PCT Pub. No.: WO2009/157349
PCT Pub. Date: Dec. 30, 2009

(65) Prior Publication Data
US 2011/0067921 A1    Mar. 24, 2011

(30) Foreign Application Priority Data
Jun. 27, 2008 (JP) .................................. 2008-168821

(51) Int. Cl.
H01B 7/00 (2006.01)
H01B 7/295 (2006.01)
H01B 3/44 (2006.01)
C08K 5/13 (2006.01)

(52) U.S. Cl.
CPC ............... *H01B 7/295* (2013.01); *H01B 3/441* (2013.01); *C08K 5/13* (2013.01)
USPC ................................. 174/110 R; 174/110 SR

(58) Field of Classification Search
USPC ... 174/110 R, 110 A–110 PM, 113 R, 120 R, 174/120 AR, 121 AR
See application file for complete search history.

(56) References Cited

U.S. PATENT DOCUMENTS

| | | | | |
|---|---|---|---|---|
| 5,418,272 | A | | 5/1995 | Kawabata et al. |
| 5,803,947 | A | * | 9/1998 | Engell et al. ................. 75/10.33 |
| 7,709,740 | B2 | * | 5/2010 | Reyes ........................ 174/110 R |
| 2006/0128866 | A1 | * | 6/2006 | Diakoumakos et al. ...... 524/445 |
| 2006/0151758 | A1 | * | 7/2006 | Reyes ............................ 252/601 |
| 2006/0194909 | A1 | | 8/2006 | Inoue et al. |
| 2007/0048524 | A1 | | 3/2007 | Hase |
| 2007/0261877 | A1 | * | 11/2007 | Mhetar et al. ............. 174/110 R |
| 2007/0261878 | A1 | * | 11/2007 | Kosaka et al. ........... 174/110 SR |
| 2007/0262483 | A1 | * | 11/2007 | Grasselli et al. ......... 264/172.19 |
| 2010/0000787 | A1 | | 1/2010 | Shimada et al. |

FOREIGN PATENT DOCUMENTS

| | | | |
|---|---|---|---|
| DE | 11 2004 000 911 T5 | 4/2006 | |
| DE | 11 2007 003 027 T5 | 10/2009 | |
| DE | 11 2004 002 347 B4 | 2/2012 | |
| JP | B2-3280099 | 2/2002 | |
| JP | 2006-348136 | * 6/2005 | .............. C08L 23/10 |
| JP | A-2006-316118 | 11/2006 | |
| JP | A-2006-348136 | 12/2006 | |
| JP | A-2006-348137 | 12/2006 | |
| JP | 2008-144066 | * 6/2008 | .............. C08L 23/14 |
| JP | A-2008-144066 | 6/2008 | |

OTHER PUBLICATIONS

Fine Chemical Industrial Raw Material & Intermediates, p. 14, Nov. 10, 2003.*
May 2, 2012 Office Action issued in Chinese Patent Application No. 200980124506.0 (with translation).
Oct. 29, 2012 Office Action issued in German Patent Application No. 11 2009 001 532.8 (with translation).
Jan. 6, 2013 Office Action issued in Chinese Patent Application No. 200980124506.0 (with translation).
"Magnesium hydroxide (flame retardant for a plastic)", Fine Chemical Industrial Raw Materials & Intermediates, No. 10, 2003 (with translation).
Jul. 3, 2013 Office Action issued in Chinese Patent Application No. 200980124506.0 (with translation).
Aug. 20, 2013 Office Action issued in Japanese Patent Application No. 2008-168821 w/translation.
Jul. 11, 2014 Notification of Reexamination issued in Chinese Patent Application No. 200980124506.0 (with English Translation).
International Search Report dated Jul. 28, 2009 in corresponding International Application No. PCT/JP2009/060987 (with translation).
Jan. 21, 2014 Decision of Refusal issued in Japanese Patent Application No. 2008-168821 (with English-language translation).

* cited by examiner

*Primary Examiner* — William H Mayo, III
(74) *Attorney, Agent, or Firm* — Oliff PLC

(57) ABSTRACT

A flame-retardant composition that is not colored during compounding and molding, and a covered electric wire using the same. The flame-retardant composition contains at least a matrix polymer such as an olefin resin, a phenolic antioxidant having tert-butyl groups in positions 2 and 6 of a hydroxyl group, and a flame retardant that is a pulverized natural mineral containing magnesium hydroxide as the main ingredient, and the iron oxide concentration in the flame retardant is 1000 ppm or less. The covered electric wire uses the flame-retardant composition as a covering material.

15 Claims, No Drawings

FLAME-RETARDANT COMPOSITION, COVERED ELECTRIC WIRE, AND WIRING HARNESS

CROSS-REFERENCE TO RELATED APPLICATION

This application is based on and claims priority under 35 U.S.C. 119 from Japanese Patent Application No. 2008-168821, filed on Jun. 27, 2008.

BACKGROUND OF THE INVENTION

1. Technical Field

The present invention relates to a flame-retardant composition that is preferably used as a covering material of a covered electric wire that is preferably used for wiring of parts for a car and parts for an electrical/electronic appliance, and a covered electric wire and a wiring harness using the same.

2. Background Art

A variety of properties such as mechanical properties, flame retardancy, heat resistance, and cold resistance are required of an insulated material that is preferably used for parts for a car such as an automobile and parts for an electrical/electronic appliance according to the intended use. Conventionally, for the insulated material, a material that is prepared by blending a polyvinyl chloride resin compound and a halogenous flame retardant containing a halogen atom is often used.

From the view point of reducing loads on the global environment, a non-halogenous material such as an olefin polymer that does not emit harmful halogenous gas during combustion has been recently used. In a material that does not have flame retardancy in itself such as the olefin polymer, a flame retardant is blended therewith in order to impart flame retardancy. Examples of the flame retardant containing no halogen atom include metal hydroxide such as magnesium hydroxide.

Examples of the magnesium hydroxide include magnesium hydroxide derived from magnesium in sea water and magnesium hydroxide derived from a natural mineral. Among them, the magnesium hydroxide derived from the natural mineral is comparatively reasonable in price, and therefore, a pulverized natural mineral containing magnesium hydroxide as the main ingredient is sometimes used as the flame retardant.

For example, Patent Literature 1, JP 3280099, discloses a flame-retardant composition that is prepared by blending a plastic or a rubber and a pulverized natural mineral containing magnesium hydroxide as the main ingredient that is a flame retardant.

However, when the pulverized natural mineral containing the magnesium hydroxide as the main ingredient is used as the flame retardant, the flame-retardant composition is sometimes colored in red during compounding or molding of the flame-retardant composition. The reason why the flame-retardant composition is colored as such was not known well.

For example, a covering material for a covered electric wire is sometimes provided with printing of letters and coloring for color coding in order to identify the kind of the electric wire. Thus, if the flame-retardant composition is colored despite the intention, printed characters are hard to see, or desired color coding cannot be performed. As a result, the identification of the electric wire could not be performed.

An object of the present invention is to provide a flame-retardant composition that is not colored during compounding or molding, and a covered electric wire and a wiring harness using the same.

SUMMARY OF THE INVENTION

After all effort, the present inventors determined the cause of the coloring of the flame-retardant composition. The present inventors found that when a specific antioxidant that is added to the flame-retardant composition is combined with iron oxide that is contained in the natural mineral containing the magnesium hydroxide as the main ingredient, the flame-retardant composition is prone to be colored, which led the present inventors to the present invention.

To be specific, a flame-retardant composition according to the present invention contains at least a matrix polymer, a phenolic antioxidant having tert-butyl groups in positions 2 and 6 of a hydroxyl group, and a flame retardant containing metal hydroxide as the main ingredient, and an iron oxide concentration in the flame retardant is 1000 ppm or less.

The flame-retardant is preferably a pulverized natural mineral containing magnesium hydroxide as a main ingredient.

The matrix polymer preferably contains an olefin resin.

A covered electric wire according to the present invention includes the flame-retardant composition described above as a covering material.

A wiring harness according to the present invention includes the flame-retardant composition described above.

In the flame-retardant composition according to the present invention, the iron oxide concentration in the flame retardant is limited to the specific amount or less when the specific antioxidant is contained, and therefore, unintentional coloring is prevented. Thus, for example, when the flame-retardant composition is used for a covering material of a covered electric wire, printing of letters and coloring for color coding are possible, and the kind of the electric wire is easily identified.

When the flame retardant is the pulverized natural mineral containing the magnesium hydroxide as the main ingredient, the advantage of preventing coloring becomes excellent.

Because an olefin resin is usually used for a variety of insulating materials, the flame-retardant composition may be used for a variety of insulating materials when the matrix polymer contains the olefin resin.

Because the covered electric wire and the wiring harness according to the present invention include the flame-retardant composition described above, printing of letters and coloring for color coding are possible, and identification of the covered electric wire and the wiring harness is easily performed.

DETAILED DESCRIPTION OF EMBODIMENTS

A detailed description of a preferred embodiment of the present invention will now be provided. A flame-retardant composition according to the present invention includes at least a matrix polymer, a specific antioxidant, and a flame retardant containing metal hydroxide as the main ingredient. In the flame-retardant composition according to the present invention, the kind of the matrix polymer is not particularly limited. A variety of combinations of additives have been studied, and it has been confirmed that the present invention achieves a special advantage when the specific antioxidant and the flame retardant containing the metal hydroxide as the main ingredient are combined.

The specific antioxidant is a phenolic antioxidant, which is a compound having tert-butyl groups in positions 2 and 6 of a hydroxyl group of an aromatic ring. This compound is categorized as a so-called hindered phenolic antioxidant. The compound may have a substituent in other positions of the aromatic ring, but may not have a substituent. It is preferable that the compound further has a substituent in position 4 of the hydroxyl group of the aromatic ring.

Examples of the compound include pentaerythritol tetrakis [3-(3,5-di-tert-butyl-4-hydroxyphenyl)propionate], thiodiethylene bis[3-(3,5-di-tert-butyl-4-hydroxyphenyl)propionate], octadecyl-3-(3,5-di-tert-butyl-4-hydroxyphenyl) propionate], N,N'-hexane-1,6-diylbis[3-(3,5-di-tert-butyl-4-hydroxyphenyl)propionamide], benzene propanoic acid 3,5-bis(1,1-dimethylethyl)-4-hydroxy C7-C9 alkyl ester, 3,3',3'', 5,5',5''-hexa-tert-butyl-α,α',α''-(mesitylene-2,4,6-triyl)tri-p-cresol, calcium diethylbis[[[3,5-bis(1,1-dimethylethyl)-4-hydroxyphenyl]methyl]phosphonate], hexamethylene bis[3-(3,5-di-tert-butyl-4-hydroxyphenyl)propionate], 1,3,5-tris(3, 5-di-tert-butyl-4-hydroxybenzyl)-1,3,5-triazine-2,4,6(1H, 3H,5H)-trione, 2,6-di-tert-butyl-4-(4,6-bis(octylthio)-1,3,5-triazine-2-ylamino)phenol, diethyl[[3,5-bis(1,1-dimethylethyl)-4-hydroxyphenyl]methyl]phosphonate], and 2',3-bis[[3-(3,5-di-tert-butyl-4-hydroxyphenyl)]]propionohydrazide. They may be used singly or in combination.

The content of the specific antioxidant is not particularly limited and may be within a generally used range. The content of the specific antioxidant is preferably within the range of 0.1 to 5 parts by mass and more preferably within the range of 0.2 to 4 parts by mass with respect to 100 parts by mass of the matrix polymer.

Examples of the metal hydroxide in the flame retardant include magnesium hydroxide, aluminum hydroxide, and calcium hydroxide. One or more of them may be contained. The magnesium hydroxide is preferable because the magnesium hydroxide has a relatively high emission temperature of crystalline water, and moisture release is hard to occur and foaming of the flame-retardant composition is easily prevented under high temperature condition during preparation of the flame-retardant composition.

The magnesium hydroxide is preferably derived from a natural mineral (a pulverized natural mineral). The magnesium hydroxide derived from the natural mineral is reasonable in price. In addition, carbonation of the magnesium hydroxide caused by reaction with moisture and carbon dioxide in the air is hard to occur. The magnesium hydroxide may be derived from magnesium in sea water.

In the flame-retardant (crude metal hydroxide), impurities are contained in addition to the metal hydroxide depending on the material and the production method. If the metal hydroxide is the magnesium hydroxide, the impurities are iron, aluminum, silicon, and calcium. If the metal hydroxide is aluminum hydroxide, the impurities are iron and silicon. If the metal hydroxide is calcium hydroxide, the impurities are iron and silicon. The impurity concentration also differs according to the material and the production method.

When the flame retardant contains the impurities other than iron, the flame-retardant composition is not colored if the flame retardant is used in combination with the specific antioxidant and other additives. In addition, when the flame retardant contains the impurities including iron, the flame-retardant composition is not colored if the flame retardant is used in combination with the additives other than the specific antioxidant. When the flame retardant contains the impurities including iron, the flame-retardant composition is sometimes colored if the flame retardant is used in combination with the additives other than the specific antioxidant.

Thus, according to the present invention, among the impurities, the content of iron is lowered in view of the relation with the specific antioxidant. This is because if the content of iron is high, the flame-retardant composition is colored in red when the flame retardant is used in combination with the specific antioxidant. In a natural mineral, for example, iron exists in the state of oxide. Therefore, the content of iron oxide ($Fe_2O_3$) is limited to within a specific range. Specifically, the iron oxide concentration in the flame-retardant is preferably 1000 ppm or less. In order to limit the iron oxide concentration to within the range described above, iron is removed or extracted from the metal hydroxide by the use of a known iron removal device or a known extraction method until the iron oxide concentration becomes lower than a desired concentration.

As a method of measuring the content of iron in the metal hydroxide, an ICP emission analysis or a fluorescent X-ray analysis is used, for example. The ICP emission analysis is preferably used in view of excellent quantitative capability. During the analysis, the iron concentration is measured, and the measured iron concentration is converted to the iron oxide concentration.

The iron oxide concentration in the flame retardant is more preferably 950 ppm or less and still more preferably 900 ppm or less. For example, when a polymer having a high melting temperature such as an engineering plastic is used as the matrix polymer, a kneading temperature becomes much higher during compounding or molding of the flame-retardant composition, and the flame-retardant composition is easily colored. Thus, by limiting the iron oxide concentration to within the more preferable range or the still more preferably range, the flame-retardant composition is not colored even when the polymer having a high melting temperature is used.

The average particle size of the metal hydroxide is preferably within the range of 0.1 to 20 μm, more preferably within the range of 0.2 to 10 μm, and still more preferably within the range of 0.5 to 5 μm. With the average particle size being less than 0.1 μm, secondary cohesion easily occurs, and mechanical properties such as wear resistance of the flame-retardant composition are easily lowered. With the average particle size being more than 20 μm, poor appearance tends to occur when the flame-retardant composition is used for an electric wire covering material.

The content of the metal hydroxide is preferably within the range of 30 to 250 parts by mass, more preferably within the range of 50 to 200 parts by mass, and still more preferably within the range of 60 to 180 parts by mass with respect to 100 parts by mass of the matrix polymer. With the content of the metal hydroxide being less than 30 parts by mass, an advantage of giving flame retardancy to the matrix polymer is easily lowered. With the content of the metal hydroxide being more than 250 parts by mass, mechanical properties of the flame-retardant composition are easily lowered.

The metal hydroxide may be subjected to surface treatment in view of improving compatibility with the matrix polymer. Examples of a surface treatment agent include a generally used surface treatment agent such as a silane coupling agent, a fatty acid, a fatty acid derivative, a higher alcohol, and a wax, and a homopolymer or a copolymer of alpha-olefins such as 1-heptene, 1-octene, 1-nonene, and 1-decene. They may be used singly or in combination.

A functional group may be introduced in the surface treatment agent. Examples of a compound that is used in the introduction of the functional group include an unsaturated carboxylic acid and its derivative. Specific examples include a maleic acid anhydride, a maleic acid, a maleic acid monoester, a maleic acid diester, and a fumaric acid. They may be used singly or in combination. Among them, a maleic acid anhydride and a maleic acid are preferable.

As a method of introducing the functional group in the surface treatment agent, a grafting method or a direct method (copolymerization method) is used. The introduction amount is preferably within the range of 0.1 to 20 mass %, more preferably within the range of 0.2 to 10 mass %, and still more preferably within the range of 0.2 to 5 mass %.

The content of the surface treatment agent is preferably within the range of 0.1 to 10 parts by mass and more preferably within the range of 0.5 to 3 parts by mass with respect to 100 parts by mass of the metal hydroxide. With the content of the surface treatment agent being less than 0.1 parts by mass, the surface treatment advantage is small, and the advantage such as improved compatibility with the matrix polymer is easily lowered. With the content of the surface treatment agent being more than 10 parts by mass, excess of the surface treatment agent tends to remain as impurities, so that properties of the flame-retardant composition are easily degraded.

The method of surface treatment of the metal hydroxide is not particularly limited. When the pulverized natural mineral is used as the metal hydroxide, a previously pulverized natural mineral may be subjected to the surface treatment, or the surface treatment may be performed on a natural mineral simultaneously with pulverization. The surface treatment may be of a wet type using a solvent or of a dry type not using a solvent. In the case of the surface treatment of the wet type, examples of a favorable solvent include an aliphatic hydrocarbon solvent such as pentane, hexane, and heptane, and an aromatic hydrocarbon solvent such as benzene, toluene, and xylene. In addition, the surface treatment may be performed during the preparation of the flame-retardant composition such that at the time of kneading the metal hydroxide (flame retardant) with no surface treatment and the matrix polymer, the surface treatment agent is blended and is concurrently kneaded.

Examples of the matrix polymer include a resin such as polypropylene (PP), polyethylene (PE), ethylene, propylene, an alpha-olefin polymer or copolymer of 1-butene, 1-pentene, 1-hexene, 1-heptene, and 1-octene, an olefin resin such as ethylene-methyl acrylate (EMA), ethylene-ethyl acrylate (EEA), ethylene-butyl acrylate (EBA), ethylene-methyl methacrylate (EMMA), and ethylene-vinyl acetate (EVA), a polyamide resin (PA), a polyester resin such as polyethylene terephthalate (PET) and polybutylene terephthalate (PBT), a polysulfone resin, a polyarylate resin, a polyphenylene ether resin (PPE), a polyphenylene sulfide resin (PPS), a thermoplastic polyurethane resin, and an engineering plastic such as polycarbonate (PC).

Examples of the matrix polymer also include an elastomer such as an olefin elastomer (TPO), a styrene elastomer (e.g., SEBS), an amide elastomer, an ester elastomer, a urethane elastomer, an ionomer, a fluorinatedelastomer, and a thermoplastic elastomer such as 1,2-polybutadiene and trans-1,4-polyisoprene. Examples of the matrix polymer also include a rubber such as an ethylene-propylene rubber (EPR), a butadiene rubber (BR), and an isoprene rubber (IR). The polymers described above that can be used as the matrix polymer may be used singly or in combination.

Additives that are generally used in a flame-retardant composition may be blended within the ranges of not impairing the advantages of the present invention. Examples of the additives include a filler, an antioxidant, a metal deactivator (a copper inhibitor), an ultraviolet absorber, an ultraviolet-concealing agent, a flame retardant, a flame-retardant auxiliary agent, a processing aid (e.g., lubricant, wax), and a coloring pigment.

The method of producing the flame-retardant composition according to the present invention is not particularly limited, and known production methods may be used. The flame-retardant composition may be obtained by blending the matrix polymer, the specific antioxidant, the flame retardant, and optionally other additives, and then dry blending them by the use of a generally used tumbler, or by melting and kneading them by the use of a generally used kneader such as a Banbury mixer, a pressure kneader, a kneading extruder, a twin screw extruder, and a roll so as to uniformly disperse them.

A temperature during kneading is preferably such a temperature that viscosity of the organic copolymer is lowered to such a degree that the flame retardant and other materials are easily dispersed in the composition. The temperature is specifically within the range of 100° C. to 300° C. If heat is generated by shearing of the organic polymer during kneading, the temperature is adjusted to an optimum temperature in consideration of the temperature rise by heat generation.

After kneading, the flame-retardant composition is taken out from the kneader. In this occasion, it is preferable to mold the flame-retardant composition into pellet form by the use of a pelletizer.

The intended use of the polymer composition according to the present invention is not particularly limited. The polymer composition may be used for a covering material of a covered electric wire that is preferably used for wiring of parts for a car and parts for electric/electronic appliance, a wiring harness protective material for covering an electric wire bundle, connector components such as a connector housing, medical appliance, artificial organ, a polymer coating material, and an architectural material that are materials to which a flame retardant is added.

Next, descriptions of a covered electric wire according to the present invention and a wiring harness according to the present invention will be provided.

The covered electric wire according to the present invention uses the flame-retardant composition described above as the material of a covering material. The covered electric wire has such a structure that the covering material directly covers the conductor, or an intermediate member such as an insulator and a shielded conductor is interposed between the conductor and the covering material. The covering material may be formed of a plurality of layers.

The size and the material of the conductor are not particularly limited and may be determined according to the intended use. The thickness of the covering material is not particularly limited and may be arbitrarily determined in consideration of the size of the conductor.

The covered electric wire is preferably produced by extrusion-covering the conductor by the use of an extrusion molding machine with the flame-retardant composition according to the present invention that is kneaded by the use of a generally used kneader such as a Banbury mixer, a pressure kneader, and a roll. Alternatively, the covered electric wire may be produced by extrusion-covering the conductor with the flame-retardant composition while kneading and preparing the flame-retardant composition by the use of a single-screw extruder or a twin-screw extruder.

The wiring harness according to the present invention uses the above-described flame-retardant composition. The wiring harness according to the present invention may include the covered electric wire according to the present invention that uses the above-described flame-retardant composition as the material of the covering material or may include the above-described flame-retardant composition as the material of the wiring harness protective material that covers the electric wire bundle including a plurality of covered electric wires. The electric wire bundle in the case of using the above-described flame-retardant composition as the material of the wiring harness protective material may or may not include the covered electric wire according to the present invention. The number of electric wires may be arbitrarily determined and is not particularly limited.

The wiring harness protective material is arranged to cover an electric wire bundle in which a plurality of covered electric wires are bunched and has the function of protecting the electric wire bundle from the outside environment. The base material of the wiring harness protective material is not particularly limited. However, an olefin flame-retardant composition such as polyethylene and polypropylene is preferable.

The wiring harness protective material may be selected according to the intended use from a tape-shaped base material on at least one side of which an adhesive is applied, and a tube-shaped or sheet-shaped base material.

Example

A more detailed description of the present invention will now be provided specifically with reference to Example. However, the present invention is not limited thereto.

Material Used, Manufacturer, and Other Information

Materials used in present examples and comparative examples are provided below along with their manufacturers, trade names, and other information.

Polypropylene (PP) [manuf.: JAPAN POLYPROPYLENE CORPORATION, trade name: NOVATEC-PP EC7]

Magnesium hydroxide [manuf.: FIMATEC LTD., trade name: JUNMAG C]

Phenolic antioxidant <1> [manuf.: CIBA SPECIALTY CHEMICALS INC., trade name: IRGANOX 1010]

Phenolic antioxidant <2> [manuf.: CIBA SPECIALTY CHEMICALS INC., trade name: IRGANOX 1035]

Phenolic antioxidant <3> [manuf.: CIBA SPECIALTY CHEMICALS INC., trade name: IRGANOX 1076]

Phenolic antioxidant <4> [manuf.: CIBA SPECIALTY CHEMICALS INC., trade name: IRGANOX 1098]

Phenolic antioxidant <5> [manuf.: ADEKA CORPORATION, trade name: ADK STAB AO-20]

Phenolic antioxidant <6> [manuf.: ADEKA CORPORATION, trade name: ADK STAB AO-50]

(Preparation of Magnesium Hydroxide)

The magnesium hydroxides provided in Table 1 were each prepared by performing iron removal on "JUNMAG C" manufactured by FIMATEC LTD. described above and limiting the iron oxide concentrations to the values provided in Table 1. The iron removal was performed by the use of an iron removal device "ROTARY CATCHER" manufactured by SEISHIN ENTERPRISE CO., LTD. in such a manner that the magnesium hydroxides in powder form were made to fall from magnet bars. The magnesium hydroxides were measured for the iron concentrations by the ICP emission analysis, and the iron concentrations were converted to the iron oxide concentrations. As a result of the measurement by the ICP emission analysis, the iron concentrations before iron removal were 10000 ppm.

Preparation of Flame-Retardant Composition

The ingredients of each flame-retardant composition provided in Table 1 were charged into a twin screw extruder and were heat-kneaded at 200° C. Then, the kneaded compositions were formed into pellets by the use of a pelletizer. Accordingly, flame-retardant compositions according to the present examples and flame-retardant compositions according to the comparative examples were prepared. It should be noted that the contents of the ingredients shown in Table 1 are expressed in the unit parts by mass.

Preparation of Covered Electric Wire

A conductor of an annealed copper strand including seven annealed copper wires (cross sectional area: 0.5 mm$^2$) was extrusion-covered with each of the flame-retardant compositions to have a thickness of 0.20 mm by the use of an extrusion molding machine having a caliber of 50 mm. Thus, covered electric wires according to the present examples and the comparative examples were obtained.

Colored or not Colored

An insulated covering material of each of the covered electric wires was visually observed in order to check whether the insulated covering material was colored or not colored. If the color of the insulated covering material was white, the insulated covering material was evaluated as "not colored", and if the color of the insulated covering material was red, the insulated covering material was evaluated as "colored".

Table 1

TABLE 1

|  | Present example | | | | | | Comparative example | | | | | |
| --- | --- | --- | --- | --- | --- | --- | --- | --- | --- | --- | --- | --- |
|  | 1 | 2 | 3 | 4 | 5 | 6 | 1 | 2 | 3 | 4 | 5 | 6 |
| Polypropylene | 50 | 50 | 50 | 50 | 50 | 50 | 50 | 50 | 50 | 50 | 50 | 50 |
| Magnesium hydroxide <1> (Iron oxide concentration 100 ppm) | 50 |  |  | 50 |  |  |  |  |  |  |  |  |
| Magnesium hydroxide <2> (Iron oxide concentration 500 ppm) |  | 50 |  |  | 50 |  |  |  |  |  |  |  |
| Magnesium hydroxide <3> (Iron oxide concentration 900 ppm) |  |  | 50 |  |  | 50 |  |  |  |  |  |  |
| Magnesium hydroxide <4> (Iron oxide concentration 1200 ppm) |  |  |  |  |  |  | 50 |  |  | 50 |  |  |
| Magnesium hydroxide <5> (Iron oxide concentration 1500 ppm) |  |  |  |  |  |  |  | 50 |  |  | 50 |  |
| Magnesium hydroxide <6> (Iron oxide concentration 2000 ppm) |  |  |  |  |  |  |  |  | 50 |  |  | 50 |
| Phenolic antioxidant <1> | 1 |  |  |  |  |  | 1 |  |  |  |  |  |
| Phenolic antioxidant <2> |  | 1 |  |  |  |  |  | 1 |  |  |  |  |
| Phenolic antioxidant <3> |  |  | 1 |  |  |  |  |  | 1 |  |  |  |
| Phenolic antioxidant <4> |  |  |  | 1 |  |  |  |  |  | 1 |  |  |
| Phenolic antioxidant <5> |  |  |  |  | 1 |  |  |  |  |  | 1 |  |
| Phenolic antioxidant <6> |  |  |  |  |  | 1 |  |  |  |  |  | 1 |
| Colored or Not colored | Not colored | Not colored | Not colored | Not colored | Not colored | Not colored | Colored | Colored | Colored | Colored | Colored | Colored |

Table 1 shows that when the flame-retardant composition contains the phenolic antioxidant having the tert-butyl groups in positions 2 and 6 of the hydroxyl group, the flame-retardant composition is colored in red if the iron oxide concentration in the magnesium hydroxide is high. In addition, it was confirmed that the flame-retardant composition was not colored if the iron oxide concentration was limited to 1000 ppm or less.

In the present examples and the comparative examples, the magnesium hydroxides containing the natural minerals as the main ingredients were studied. However, it is easily estimated that the same results are obtained also in the case of using magnesium hydroxide not containing a natural mineral as the main ingredient and other metal hydroxides such as aluminum hydroxide by limiting the concentrations of iron oxides that are contained as impurities to 1000 ppm or less.

The foregoing description of the preferred embodiments of the invention is not intended to be exhaustive or to limit the invention to the precise form disclosed, and modifications and variations are possible in the light of the above teachings or may be acquired from practice of the invention.

The invention claimed is:

1. A flame-retardant composition comprising:
   a matrix polymer;
   a phenolic antioxidant having tert-butyl groups in positions 2 and 6 of a hydroxyl group; and
   a flame retardant containing metal hydroxide as a main ingredient,
   wherein
   an iron oxide concentration in the flame retardant is from 100 ppm to 900 ppm.

2. The flame-retardant composition according to claim 1, wherein the flame retardant comprises a pulverized natural mineral containing magnesium hydroxide as a main ingredient.

3. The flame-retardant composition according to claim 2, wherein the matrix polymer contains an olefin resin.

4. A covered electric wire comprising the flame-retardant composition according to claim 3 as a covering material.

5. A wiring harness comprising the flame-retardant composition according to claim 3.

6. A covered electric wire comprising the flame-retardant composition according to claim 2 as a covering material.

7. A wiring harness comprising the flame-retardant composition according to claim 2.

8. The flame-retardant composition according to claim 1, wherein the matrix polymer contains an olefin resin.

9. A covered electric wire comprising the flame-retardant composition according to claim 8 as a covering material.

10. A wiring harness comprising the flame-retardant composition according to claim 8.

11. A covered electric wire comprising the flame-retardant composition according to claim 1 as a covering material.

12. A wiring harness comprising the flame-retardant composition according to claim 1.

13. The flame-retardant composition according to claim 1, wherein the iron oxide concentration in the flame retardant is from 100 ppm to 500 ppm.

14. The flame-retardant composition according to claim 1, wherein the iron oxide concentration in the flame retardant is from 500 ppm to 900 ppm.

15. A method for creating a flame-retardant composition comprising a matrix polymer; a phenolic antioxidant having tert-butyl groups in positions 2 and 6 of a hydroxyl group; and a flame retardant containing metal hydroxide as a main ingredient, the method comprising the step of:
   removing iron from a natural mineral containing metal hydroxide so as to generate the flame retardant having an iron oxide concentration of 100 ppm to 900 ppm.

* * * * *